G. H. GRAY.
Whiffletree.

No. 15,692.

Patented Sept. 9, 1856.

UNITED STATES PATENT OFFICE.

GEO. H. GRAY, OF CLINTON, MISSISSIPPI.

MODE OF ATTACHING HORSES TO VEHICLES.

Specification of Letters Patent No. 15,692, dated September 9, 1856.

*To all whom it may concern:*

Be it known that I, GEORGE H. GRAY, of Clinton, in the county of Hinds and State of Mississippi, have invented a new and Improved Mode of Attaching Horses to Vehicles; and I do hereby declare that the following is a full, clear, and exact description of the same, reference being had to the annexed drawings, making a part of this specification, in which—

Figure 1:
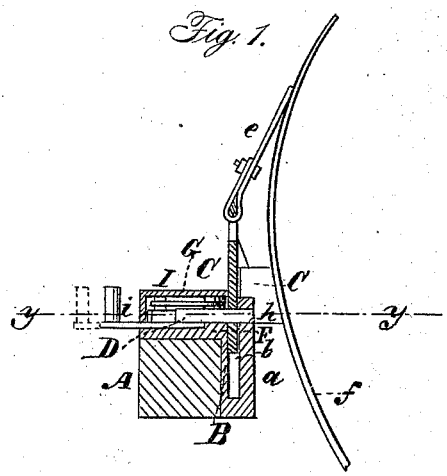
Figure 2:
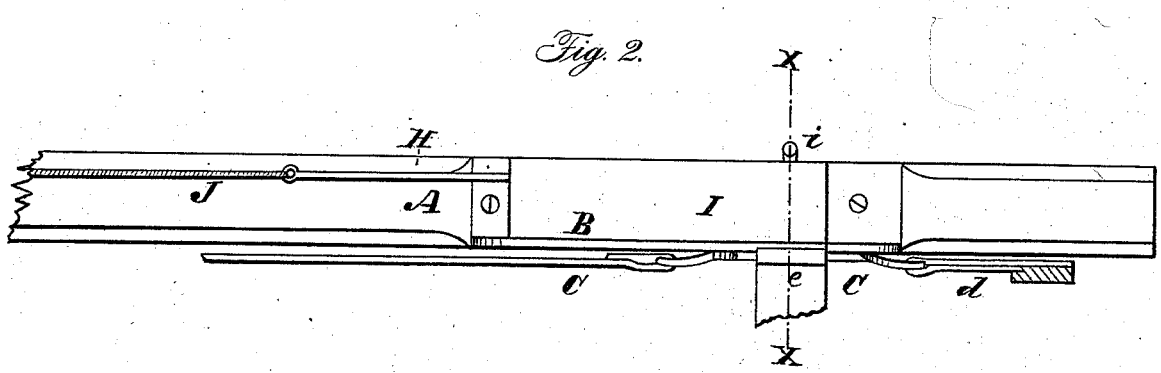
Figure 3:
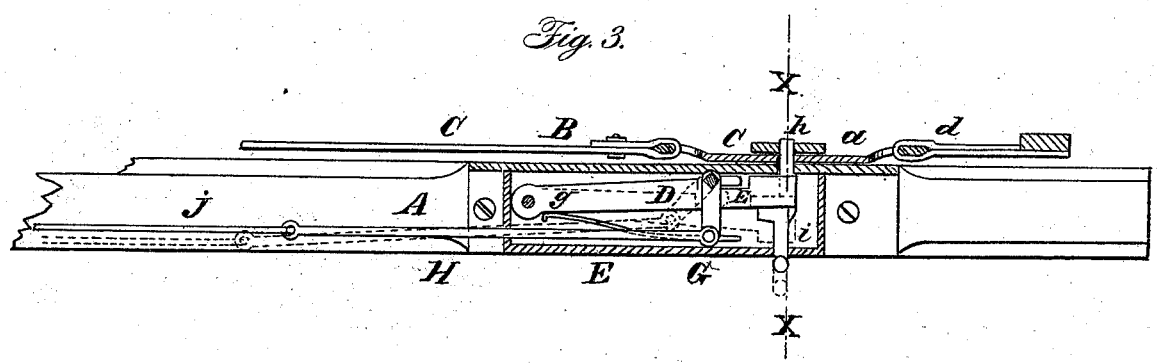

Figure 1, is a transverse vertical section of my improvement, $x$, $x$, Figs. 2 and 3, showing the plane of section. Fig. 2, is a plan or top view of ditto. Fig. 3, is a horizontal section of ditto, $y$, $y$, Fig. 1, showing the plane of section.

Similar letters of reference indicate corresponding parts in the several figures.

My invention consists in a peculiar device attached to the shafts and connected with the harness, as will be presently shown and described, whereby the usual whiffle tree and traces are dispensed with and whereby the horse may be readily detached from the vehicle when necessary.

To enable others skilled in the art to fully understand and construct my invention, I will proceed to describe it.

A, represents the shafts of a vehicle, and B, B, represent two metal plates which are attached to their inner sides at points opposite or in line with the saddle of the harness. These plates have each a loop or clasp $a$ attached to them, shown clearly in Fig. 1, and a plate C, is fitted in each loop or clasp, said plates C, having recesses $b$, cut in their lower edge to allow the lower parts of the loops or clasps to catch therein. The plates C, C, have straps $c$, attached to their back ends, said straps being attached to the breeching, and straps $d$, are attached to the front ends of the plates, said straps serving as traces and being connected with the collar. The tops of the plates C, have straps $e$, $f$, attached to them, the straps, $e$, being the back bands which are attached to the saddle and the straps $f$ forming the girth.

To the upper surface of each shaft A, and adjoining the plates B, a lever D, is attached, said levers being fitted and working on pins $g$, see Fig. 3. The outer ends of the levers have pins $h$, attached to them horizontally and these pins pass through the plates B, C, and loops or clasps $a$. A spring E, bears against each lever D, and said springs keep the pins $h$, in place. A short bar $i$, is also attached to each lever, said bars having knobs or pins at their ends.

On each shaft A, a dog F, is placed, and these dogs have each a lever G, attached to them, and the outer ends of the levers are connected to rods H, which have wires or cords $j$, attached to their ends, said wires or cords extending into the vehicle so as to be at the command of the driver.

The levers D, springs E, dogs F, and levers G, on each shaft, are covered by a plate I, as shown in Figs. 1 and 2.

From the above description, it will be seen that the plates C, form the connection between the harness and the shafts of the vehicle and the draft strain is entirely upon the loops or clasps $a$, as the recesses in the lower edges of the plates C, fit over the lower edges of the loops or clasps. The pins $h$, of the levers D, merely sustain the shafts and keep the plates C, in the loops or clasps, and are not subjected to any pull, draft or strain.

The object of the invention is to allow the horse to be readily and instantly detached from the vehicle, which is done by the driver merely drawing the cords or rods $j$, which, as they are drawn actuate the dogs F and cause the levers D, to be thrown outward, pins $h$, being of course withdrawn from the plates B, C, and loops or clasps $a$, and allowing the plates C, to pass out of the loops or clasps. In case of a horse becoming restive or unmanageable, or in case of a horse running away, accidents, which now frequently occur, may be prevented.

The bars $i$, with knobs attached are for the purpose of allowing the pins $h$ to be withdrawn by hand, so that the plates C, may be fitted in the loops or clasps in attaching the horse to the vehicle.

The device is simple, and may be applied at a small cost.

Having thus described my invention, what I claim as new and desire to secure by Letters Patent, is—

The plates C, attached to the harness as shown, and the plates B, on the shafts A, with loops or clasps $a$, attached, the levers D, with the pins $h$, on them and the dogs F, levers G and rods H, the whole being arranged as shown for the purpose specified.

GEORGE H. GRAY.

Witnesses:
   JOS. NARBON,
   P. R. LEWIS.